United States Patent
Heibel

(10) Patent No.: US 11,361,869 B2
(45) Date of Patent: Jun. 14, 2022

(54) SYSTEM AND METHOD ENABLING SIGNALS FROM REPLACEMENT SELF-POWERED NEUTRON DETECTORS TO BE USED TO GENERATE INPUTS TO LEGACY SOFTWARE

(71) Applicant: WESTINGHOUSE ELECTRIC COMPANY LLC, Cranberry Township, PA (US)

(72) Inventor: Michael D. Heibel, Harrison City, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 123 days.

(21) Appl. No.: 16/539,282

(22) Filed: Aug. 13, 2019

(65) Prior Publication Data

US 2021/0050123 A1 Feb. 18, 2021

(51) Int. Cl.
*G21C 17/108* (2006.01)
*G01T 3/00* (2006.01)
(Continued)

(52) U.S. Cl.
CPC ............ *G21C 17/108* (2013.01); *G01T 3/006* (2013.01); *G21C 17/104* (2013.01); *G21C 17/12* (2013.01); *G21C 19/207* (2013.01); *G21D 3/10* (2013.01)

(58) Field of Classification Search
CPC .. G01C 21/206; G01C 21/005; G01C 21/203; G05D 1/0033; G05D 1/0692; G06T 7/75;
(Continued)

(56) References Cited

U.S. PATENT DOCUMENTS 5,050,112 A * 9/1991 Hedglen ............... G05B 19/401
702/152
5,745,538 A 4/1998 Heibel
(Continued)

FOREIGN PATENT DOCUMENTS

EP 0853771 A1 7/1998
TW 594791 B 6/2004

OTHER PUBLICATIONS

International Search Report and Written Opinion for International PCT Application No. PCT/US2020/046204, dated Oct. 23, 2020.
(Continued)

*Primary Examiner* — Jack W Keith
*Assistant Examiner* — Daniel Wasil
(74) *Attorney, Agent, or Firm* — K&L Gates LLP

(57) ABSTRACT

A method whereby signals that are output by replacement SPNDs are converted into equivalent signals that would have been detected by legacy SPNDs for input to the legacy software. The replacement SPNDs have a different geometry than the legacy SPNDs and also have a different neutron sensitivity than the legacy SPNDs. The replacement SPNDs are subjected to a neutron flux in a core of a reactor and responsively output a set of signals. The set of signals and the geometry of the replacement SPNDs are employed to create a characterization of the neutron flux in the form of a curve that represents flux as a function of location along the core of the reactor. The legacy geometry of the legacy SPNDs is then employed to find the values on the curve that correspond with the positions where the legacy SPNDs had been located to create inputs for the legacy software.

17 Claims, 2 Drawing Sheets

(51) Int. Cl.
  *G21C 17/104* (2006.01)
  *G21C 17/12* (2006.01)
  *G21D 3/10* (2006.01)
  *G21C 19/20* (2006.01)

(58) Field of Classification Search
  CPC ...... G06T 7/73; G21C 17/108; G21C 19/207; G21C 17/104; G21C 17/12; G01T 3/006; G21D 3/10
  USPC .......................................................... 376/254
  See application file for complete search history.

(56) References Cited

U.S. PATENT DOCUMENTS

| | | |
|---|---|---|
| 6,744,840 B2 | 6/2004 | Karino et al. |
| 8,445,839 B2 | 5/2013 | Holaday et al. |
| 2011/0268239 A1 | 11/2011 | Krieg |
| 2012/0091327 A1 | 4/2012 | Holaday |
| 2014/0376768 A1* | 12/2014 | Troy ........................ G06T 7/248 382/103 |
| 2016/0324580 A1* | 11/2016 | Esterberg ................ A61B 5/055 |
| 2018/0350473 A1 | 12/2018 | van der Ende et al. |
| 2019/0033080 A1* | 1/2019 | Petrosky .............. G01C 21/206 |

OTHER PUBLICATIONS

Search Report for corresponding Taiwan Patent Application No. 109127621, dated Jun. 24, 2021.

* cited by examiner

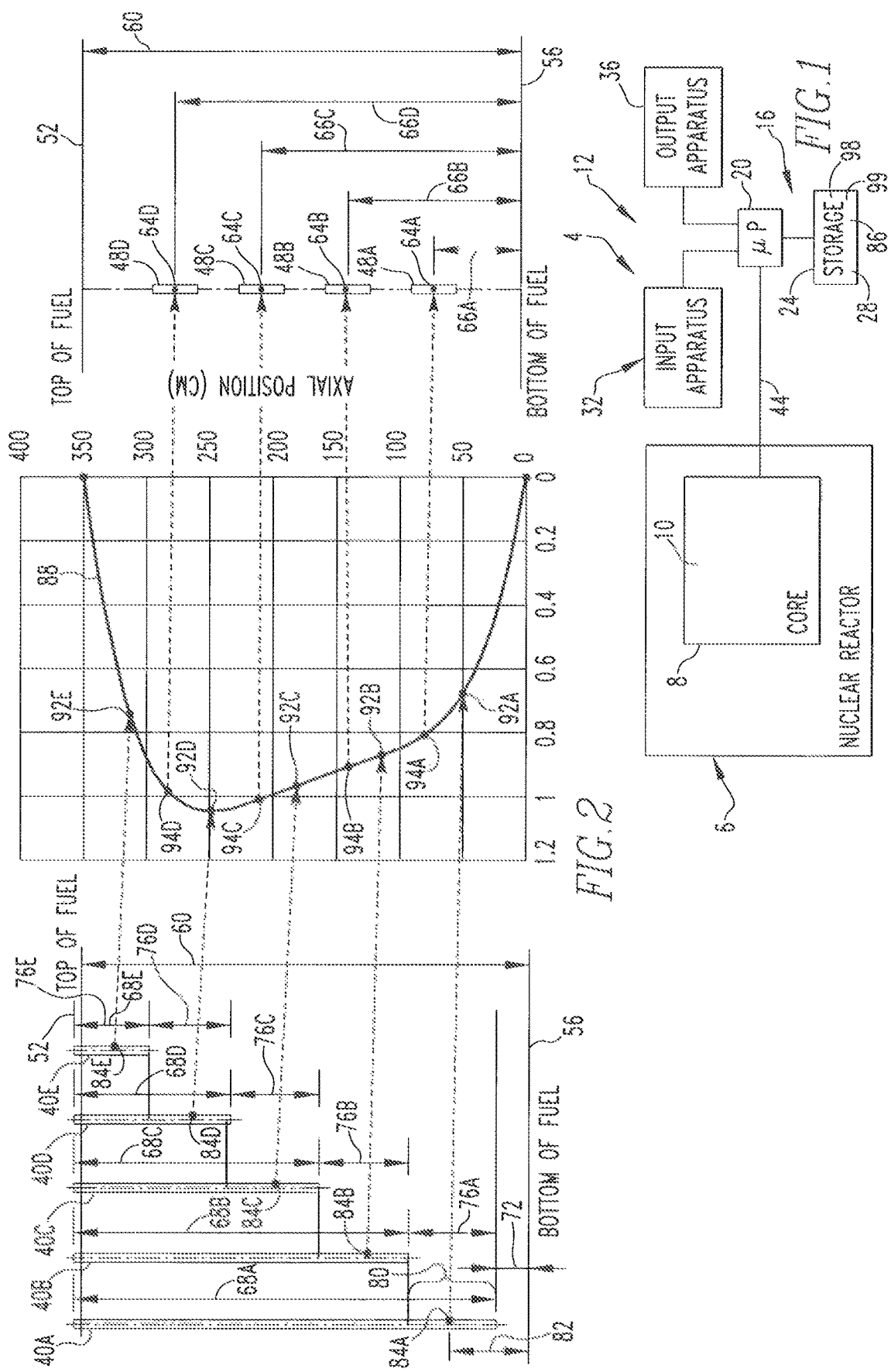

SYSTEM AND METHOD ENABLING SIGNALS FROM REPLACEMENT SELF-POWERED NEUTRON DETECTORS TO BE USED TO GENERATE INPUTS TO LEGACY SOFTWARE

BACKGROUND

1. Field

The disclosed and claimed concept relates generally to nuclear reactors and, more particularly, is directed toward a system and method that enable the signals that are generated by a number of replacement Self-Powered Neutron Detectors (SPNDs) to be used to generate inputs for legacy software that had been intended for use with a number of legacy SPNDs.

2. Related Art

Numerous types of nuclear reactors are known in the relevant art. It is also known to provide Self-Powered Neutron Detectors (SPNDs) that are situated in instrumentation thimbles within fuel assemblies of core of a nuclear reactor in order to provide signals that are representative of neutron flux within the core of the nuclear reactor. It is also know, however, that SPNDs made of rhodium degrade rapidly and need replacement. However, if the rhodium SPNDs are replaced with new rhodium SPNDs, the new rhodium SPNDs will likewise degrade in the same fashion and thus likewise eventually need replacement.

Such SPNDs have a neutron sensitivity characterized in units of amperes/nv, which is amperes per neutron flux. In the presence of a certain neutron flux, therefore, the SPND will output a certain current, as measured in amperes, and which is used as an input to a legacy software package which employs these current values and the known neutron sensitivity of the SPNDs to determine neutron flux values at various locations within the core of the nuclear reactor. Such legacy software typically also includes instructions which take into account the known degradation of the legacy SPNDs in order that the current values that serve as inputs to the legacy software are properly adjusted based upon the known neutron sensitivity of the legacy SPNDs and the know degradation of the legacy SPNDs in order for the legacy software to accurately determine the neutron flux in the core. However, such legacy software has been an impediment to replacing legacy rhodium SPNDs with something else because the license that was issued for the nuclear reactor is typically based at least in part upon the legacy software which is expecting to receive signals from rhodium SPNDs. Improvements would therefore be desirable.

SUMMARY

The disclosed and claimed concept relates to an improved system and method whereby signals that are output by replacement SPNDs are converted into equivalent signals of the type that would have been detected by legacy SPNDs for input to the legacy software. The replacement SPNDs have a different geometry than the legacy SPNDs and also have a different neutron sensitivity than the legacy SPNDs. The replacement SPNDs are subjected to a neutron flux in a core of a reactor and responsively output a set of signals. The set of signals and the geometry of the replacement SPNDs are employed to create a characterization of the neutron flux in the form of a curve that represents flux as a function of location along the core of the reactor. The legacy geometry of the legacy SPNDs is then employed to find the values on the curve that correspond with the positions along the core where the legacy SPNDs had been located. Such values along the curve are thus representative of the flux that the legacy SPNDs would have experienced at a plurality of corresponding legacy locations where the legacy SPNDs had been situated prior to their replacement. These identified flux values are then subjected to a depletion output algorithm to generate a set of representative flux values that are representative of what the plurality of legacy SPNDs in an at least partially depleted state would have output in response to the neutron flux at the corresponding legacy locations. The depleted representative flux values are then multiplied by the average neutron sensitivity of the legacy SPNDs in order to generate a set of current signals that are input to the legacy software in order to enable the legacy software to determine a set of neutron flux values for the reactor core based upon signals from the replacement SPNDs.

Accordingly, an aspect of the disclosed and claimed concept is to provide an improved system and method that enable replacement SPNDs that are formed of a different material than a number of legacy SPNDs and/or that have a different neutron sensitivity than the number of legacy SPNDs and/or that have a different geometry than the number of legacy SPNDs to be used in place of the number of legacy SPNDs.

Another aspect of the disclosed and claimed concept is to enable existing legacy software that was designed to receive a signal from a set of legacy SPNDs, such as those formed from rhodium, to be employed in determining a number of neutron flux values for a core of a nuclear reactor based upon signals that are obtained from a number of replacement SPNDs, such as those formed from vanadium. As employed herein, the expression "a number of" and variations therefore shall refer broadly to any non-zero quantity, including a quantity of one.

Another aspect of the disclosed and claimed concept is to enable a number of legacy SPNDs, such that as may have been formed from rhodium, to be replaced with a number of replacement SPNDs, such as may have been formed from vanadium, and to enable the signals from the replacement SPNDs to be used to generate inputs for legacy software that is used to determine a neutron flux profile within the core of the nuclear reactor.

Accordingly, an aspect of the disclosed and claimed concept is to provide an improved method of enabling a plurality of replacement Self-Powered Neutron Detectors (SPNDs) to be used in place of a plurality of legacy SPNDs that previously were situated at a plurality of corresponding legacy locations along a core of a nuclear reactor and that previously provided to a processor apparatus a set of inputs that were representative of a neutron flux in the core as detected at the plurality of corresponding legacy locations. The method can be generally stated as including subjecting the plurality of replacement SPNDs to the neutron flux and, responsive thereto, receiving from the plurality of replacement SPNDs a set of signals, employing the set of signals to generate a plurality of measured flux values at a plurality of corresponding replacement locations along the core, subjecting the plurality of measured flux values to a fitting tool to generate a characterization of the neutron flux as a function of location along the core, employing the characterization and the plurality of corresponding legacy locations to generate a set of representative flux values that are representative of the neutron flux that the plurality of legacy SPNDs would have experienced at the plurality of corresponding legacy locations, and inputting to the processor apparatus as the set of inputs a number of signals that are based at least in part upon the set of representative flux values.

Another aspect of the disclosed and claimed concept is to provide an improved system the general nature of which can be generally stated as including a nuclear reactor having a core, a processor apparatus, a plurality of replacement Self-Powered Neutron Detectors (SPNDs) positioned in the core in place of a plurality of legacy SPNDs that previously were situated at a plurality of corresponding legacy locations along the core and that previously provided to the processor apparatus a set of inputs that were representative of a neutron flux in the core as detected at the plurality of corresponding legacy locations, the processor apparatus comprising a set of instructions which, when executed on the processor apparatus, cause the processor apparatus to perform operations that can be generally stated as including receiving from the plurality of replacement SPNDs a set of signals responsive to the plurality of replacement SPNDs being subject to the neutron flux, employing the set of signals to generate a plurality of measured flux values at a plurality of corresponding replacement locations along the core, subjecting the plurality of measured flux values to a fitting tool to generate a characterization of the neutron flux as a function of location along the core, employing the characterization and the plurality of corresponding legacy locations to generate a set of representative flux values that are representative of the neutron flux that the plurality of legacy SPNDs would have experienced at the plurality of corresponding legacy locations, and employing as the set of inputs a number of signals that are based at least in part upon the set of representative flux values.

BRIEF DESCRIPTION OF THE DRAWINGS

A further understanding of the invention can be gained from the following Description when read in conjunction with the accompanying drawings in which:

FIG. 1 is a schematic depiction of an improved system in accordance with the disclosed and claimed concept upon which an improved method in accordance with the disclosed and claimed concept can be performed;

FIG. 2 is a depiction of the way in which the geometry of a plurality of replacement SPNDs can be used in conjunction with the signals from the replacement SPNDs in order to create a characterization of a neutron flux within a core of a nuclear reactor as a function of location along the core, with the characterization then being used to determine a number of flux values that would have been experienced by a plurality of legacy SPNDs that had been situated at a plurality of corresponding legacy locations within the core, which is being done in order to generate a set of representative flux values that are used as inputs to the existing legacy software.

Similar numerals refer to similar parts throughout the specification.

DESCRIPTION

Figure 3:
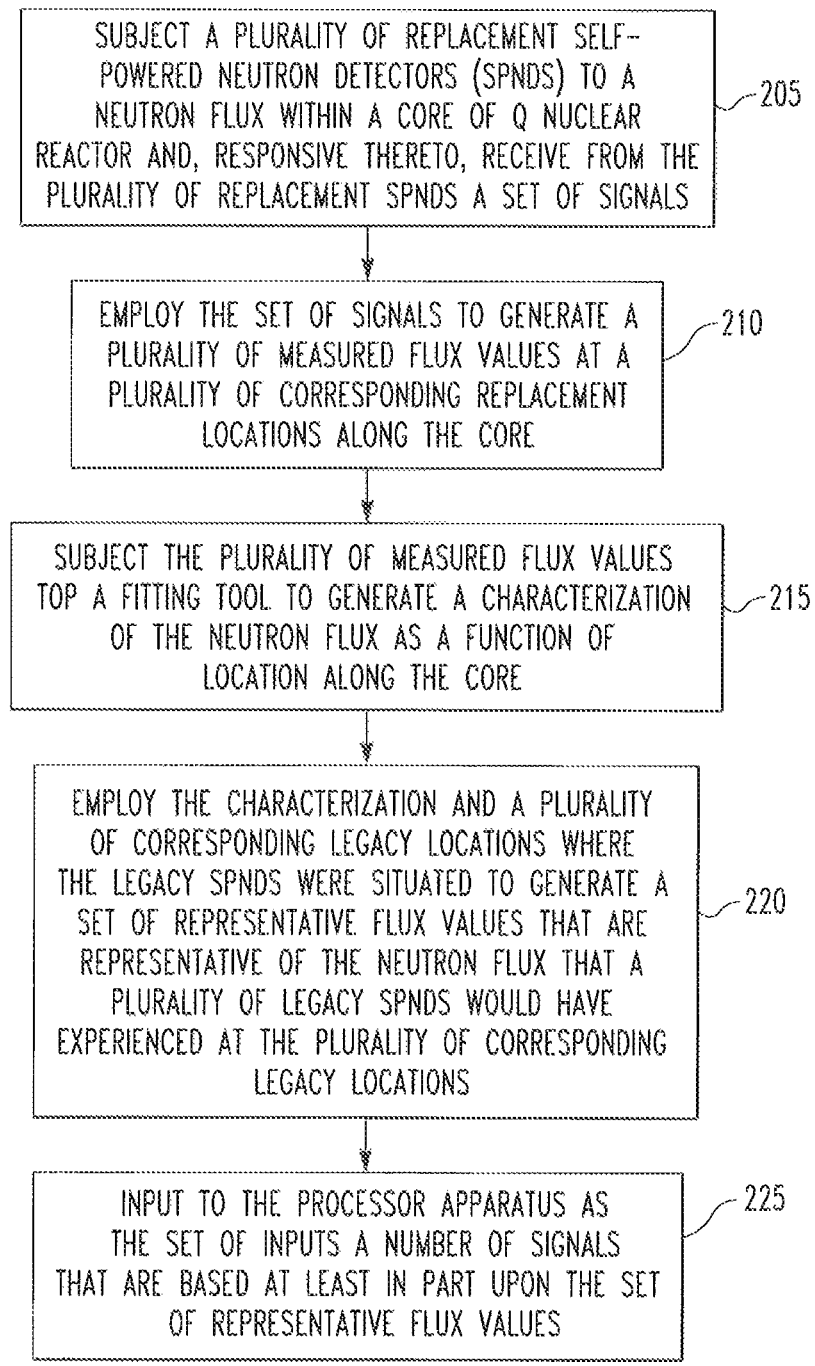
FIG. 3 is a flowchart depicting certain aspects of the improved method in accordance with the disclosed and claimed concept.

An improved system 4 in accordance with the disclosed and claimed concept is depicted generally in FIG. 1. The system includes a nuclear reactor 6 having a core 8 that includes fuel that is schematically represented at the numeral 10. The system 4 further includes a data system 12 that includes a processor apparatus 16 having a processor 20 and a storage 24 that are in communication with one another. The storage 24 has stored therein a number of routines 28 which, when executed on the processor 20, cause the data system 12 to perform certain operations such as are set forth elsewhere herein. The data system 12 further includes an input apparatus 32 that provides input signals to the processor 20 and further includes an output apparatus 36 that receives output signals from the processor 20. In the depicted exemplary embodiment the input apparatus 32 includes a plurality of replacement SPNDs that are depicted in FIG. 2 and that are indicated at the numerals 40A, 40B, 40C, 40D, and 40E, which may be collectively or individually referred to herein with the numeral 40. The replacement SPNDs 40 are connected with the processor 20 via a data link 44 that is connected with the processor 20, but the replacement SPNDs 40 are still considered to be a part of the input apparatus 32.

The replacement SPNDs 40 have taken the place of a plurality of legacy SPNDs that are depicted in FIG. 2 at the numerals 48A, 48B, 48C, and 48D, and which may be collectively or individually referred to herein with the numeral 48. The legacy SPNDs are shown in FIG. 2 in order to depict their geometry, i.e., to depict what had been their positioning with respect to the fuel, and more particularly with respect to the top of the fuel, indicated at the numeral 52, and with respect to the bottom of the fuel, indicated at the numeral 56. It is understood, however, that the legacy SPNDs 48 were removed from the core 8 and replaced with the replacement SPNDs 40, and the reason for the depiction in FIG. 2 of the legacy SPNDs 48 is merely to depict their former position within the core 8 with respect to the fuel 10.

Further regarding the fuel 10, FIG. 2 depicts with a horizontal line the location of the top of the fuel 52 and with another horizontal line the location of the bottom of the fuel 56. FIG. 2 also depicts at the numeral 60 a length of the fuel 10. In this regard, it can be seen that FIG. 2 depicts the legacy SPNDs 48A, 48B, 48C, and 48D as each being situated at a corresponding legacy location 64A, 64B, 64C, 64D, which may be collectively or individually referred to herein with the numeral 64. The legacy locations 64 in the depicted exemplary embodiment are defined as a center point along the length of each such legacy SPND 48, i.e., along the elongated axis thereof, and that is situated a corresponding legacy distance above the bottom of the fuel 56, with the legacy distances being indicated at the numerals 66A, 66B, 66C, and 66D, which may be collectively or individually referred to herein with the numeral 66.

As can further be understood from FIG. 2, the replacement SPNDs 40 are each of different lengths that are indicated at the numerals 68A, 68B, 68C, 68D, and 68E, which may be collectively or individually referred to herein with the numeral 68. As noted, the replacement SPNDs 40 are received in an instrumentation thimble that is received in a fuel assembly of the core 8. In the depicted exemplary embodiment, roughly thirty percent of the fuel assemblies in the core 8 include such an instrumentation thimble that includes an instance of the set of replacement SPNDs 40, with the replacement SPNDs being connected with the processor 20 via the data link 44. While FIG. 2 depicts the replacement SPNDs 40 being spaced apart from one another in the horizontal direction in FIG. 2, it is understood that such horizontal spacing in FIG. 2 is intended merely to enable the depiction of the different lengths 68, the way in which the lengths 68 relate to one another, and the positioning of the replacement SPNDs 40 with respect to the top of the fuel 52 and the bottom of the fuel 56. It is therefore understood that the replacement SPNDs 40 would typically be situated closely adjacent one another within the instrumentation thimble.

The output from the replacement SPNDs 40 is a current, i.e., as measured in Amperes. As a general matter, the longest of the replacement SPNDs 40, i.e., the replacement SPND 40A, will have the highest current level as its output, with the progressively shorter replacement SPNDs 40 correspondingly having lesser current outputs in the same flux environment. An advantage of the replacement SPNDs 40 over the legacy SPNDs 48 is the relatively greater length of the replacement SPNDs 40 than the legacy SPNDs 48, which gives the replacement SPNDs 40 a greater signal-to-noise ratio as compared with the legacy SPNDs 48.

The signals from the replacement SPNDs 40 are employed in order to determine a number of flux values at a number of corresponding locations along the core 8. For instance, the replacement SPND 40A is longer than the replacement SPND 40B and, more particularly, a portion 80 of the replacement SPND 40A protrudes beyond the end of the SPND 40B. The bottom (in FIG. 2) end of the protruding portion 80 is a distance 72 above the bottom of the fuel 56. Furthermore, the replacement SPNDs 40, in going from longest to shortest, have a corresponding length difference between them, with the length differences being indicated at the numerals 76A, 76B, 76C, 76D, and 76E, and which may be collectively or individually referred to herein with the numeral 76. For example, the length difference 76A is equal to the length of the protruding portion 80. Since the replacement SPND 40E is the shortest of the replacement SPNDs 40, the numeral 76E refers to the actual length of the replacement SPND 40E rather than a distance by which it is longer than another SPND 40.

By adding together the distance 72 and one-half the length difference 76A, the distance of the center of the protruding portion 80 above the bottom of the fuel 56 can be determined and is indicated at the numeral 82. This height 82 above the bottom of the fuel 56 describes a replacement location 84A on the protruding portion 80, which is the center of the protruding portion 80 along the longitudinal extent of the protruding portion 80.

In order to determine the portion of the signal from the replacement SPND 40A that represents the signal that is obtained from the protruding portion 80, the second greatest output signal, i.e., that obtained from replacement SPND 40B, is subtracted from the greatest output signal, which is that obtained from the replacement SPND 40A. This net current can be said to be representative of the average power that is generated along the protruding portion 80. It is noted that in addition to the protruding portion 80 of the replacement SPND 40A with respect to the replacement SPND 40B, the replacement SPNDs 40B, 40C, and 40D each likewise have a protruding portion that protrudes beyond the next shortest replacement SPND 40, and the longitudinal centers of such protruding portions are considered to be additional replacement locations that are indicated at the numerals 84B, 84C, and 84D. The shortest replacement SPND 40E has its own replacement location 84E that is at the center of its length that protrudes below the top of the fuel 52. These distances can be determined based upon the lengths of the replacement SPNDs 40, the length of the fuel 60, the distance 72, all in a well-understood fashion.

In a like fashion, the signal from the replacement SPND 40C is subtracted from the signal that is output by replacement SPND 40B, and it represents the average power that is generated along the length of the portion of the replacement SPND 40B that protrudes beyond the end of the replacement SPND 40C. The signals that correspond with the replacement locations 84C and 84D are obtained in a similar fashion. The signal for the replacement location 84E is simply the signal that is output from the replacement SPND 40E without subtracting another current value from it. Each of the net current outputs and the output from the replacement SPND 40E are then divided by the neutron sensitivity of the replacement SPNDs 40, which has the units amperes/nv, which is Amperes per neutron flux, in order to obtain a set measured neutron flux values that can be said to exist at the corresponding replacement locations 84A, 84B, 84C, 84D, and 84E.

Together, the replacement locations 84A, 84B, 84C, 84D, and 84E, which may be collectively or individually referred to herein with the numeral 84, and the corresponding signals from the aforementioned subtraction of signals, except in the case of the signal from the replacement SPND 40E which is simply the signal therefrom in its entirety, and the division by the neutron sensitivity, represent five pairs of data values. That is, each data value is a location along the core 8, i.e., a height or a distance above the bottom of the fuel 56, and a corresponding neutron flux. In order to complete the data set, a null value for neutron flux at each of the bottom of the fuel 56 and the top of the fuel 52 is added to the data set. These two additional null values could be of a zero magnitude, but in the depicted exemplary embodiment they are instead given a very small number, i.e., 0.1 nv, by way of example, with corresponding known positions along the core 8, the one at the bottom of the fuel 56 having a height of zero centimeters, by way of example, above the fuel 56, and the null value at the top of the fuel 52 having as its corresponding height above the bottom of the fuel 56 being the length of the fuel 60.

By way of further example, the seven neutron flux values from the aforementioned seven pairs of data values might desirably be normalized, such as by dividing each neutron flux value by the highest neutron flux value or by dividing each neutron flux value by the average neutron flux value from the various signals. Any type of normalization can be employed. This will result in seven pairs of data values that each have a unitless value representative of average neutron flux and a distance value which, in the depicted exemplary embodiment, is in centimeters, where the measured average neutron flux exists.

These seven pairs of data values (with or without the aforementioned optional normalization) are then subjected to a fitting tool 86 which fits the seven pairs of data values to a curve. One exemplary type of fitting tool 86 is one which uses the seven pairs of data values to create a sixth order polynomial having seven scalar coefficients. For instance, the polynomial that is output by the fitting tool 86 might look something like $A+BX+CX^2+DX^3+EX^4+FX^5+GX^6=0$, by way of example, wherein A-G are the scalar coefficients and wherein X is the height above the bottom of the fuel 56, in centimeters by way of example in the depicted exemplary embodiment. The aforementioned polynomial results in a characterization of the neutron flux, and example of which is depicted at the numeral 88 as being a curve, as shown in FIG. 2. The characterization 80 is a characterization of neutron flux within the core 8 as a function of location along the core 8, and is based upon a set of measured flux values that were measured from the current outputs from the replacement SPNDs 40 with the corresponding replacement locations 84.

As can further be seen in FIG. 2, a dashed-line arrow extends rightward from each of the replacement locations 84 to a corresponding point on the characterization 88. Such arrows point to a set of measured flux values on the characterization 88 that are indicated at the numerals 92A, 92B, 92C, 92D, and 92E, which may be collectively or individually referred to herein with the numeral 92. These points along the characterization 88 are referred to herein as measured flux values 92 since they are based upon the current outputs that were measured from the replacement SPNDs 40, albeit optionally normalized, but nevertheless being in the form of measurements of flux values. These measured flux values are based upon the actual outputs from the replacement SPNDs 40 and are what was used to construct the curve that forms the characterization 88, along with the aforementioned two null values for nearly zero neutron flux at the bottom of the fuel 56 and the top of the fuel 52. Each such measured flux value 92 includes on the vertical Y-axis a height above the bottom of the fuel 56 and a corresponding flux value along the horizontal X-axis. The vertical distance of the five measured flux values 92A, 92B, 92C, 92D, and 92E above the bottom of the fuel 56 is equal to the heights of the replacement locations 84A, 84B, 84C, 84D, and 84E above the bottom of the fuel 56, and the corresponding flux values of each of the five measured flux values 92A, 92B, 92C, 92D, and 92E is the corresponding measured flux value that was input into the fitting tool 86. It thus can be seen that the aforementioned five sets of data values exist on or nearly on the curve that represents the characterization 88.

The characterization 88 is then employed in conjunction with the geometry of the legacy SPNDs 48, more particularly with the legacy distances 66, to create a set of representative flux values that are indicated at the numerals 94A, 94B, 94C, and 94D, which may be collectively or individually referred to herein with the numeral 94. These legacy distances 66 are fed into the polynomial, i.e., the characterization 88, in order to determine for each of the legacy distances 66 what would be the flux value at such locations along the core 8. That is, the legacy distances 66, which are the heights of each of the legacy locations 64 above the bottom of the fuel 56, are then fed into the aforementioned polynomial in order to obtain for each of the legacy locations 64 a corresponding Y, which is the representative flux value at each of the legacy locations 64, as determined by the characterization 88 that is based upon measured flux values. The representative flux values are representative in nature because, while being actual flux values and being based upon the measured flux values 92 from the replacement SPNDs 40, the representative flux values are representative of the flux that the legacy SPNDs 48 would have experienced had the legacy SPNDs 48 been situated at their legacy locations 64 within the core. The characterization 88 thus enables a determination of a set of representative flux values 94 which are representative of the neutron flux that the legacy SPNDs 48 would have experienced at the legacy locations 64.

The representative flux values 94 are then subjected to a depletion algorithm 98 that is a part of the routines 28 in order to reduce each of the representative flux values 94 by an appropriate amount that corresponds with the degree to which the legacy SPNDs 48 would have degraded. That is, a set of legacy software 99 is among the routines 28 executable on the processor 20. The legacy software 99 is configured to accept and process flux values detected from the legacy locations 64, and the representative flux values 94 were generated based upon the characterization 88 and the legacy locations 64. It is noted, however, that the legacy software 99 is also configured to expect degraded input signals that result from a well-understood degradation of the legacy SPNDs 48 and to perform its operations based upon the expected degraded outputs from the degraded legacy SPNDs 48. As such, the representative flux values 94, which are non-degraded, are subjected to the depletion algorithm 98 in order to generate a set of depleted representative flux values that are then input to the legacy software 99. Furthermore, any other type of formatting operations that are necessary in order to prepare the set of depleted representative flux values for input to the legacy software 99 are also performed.

It thus can be seen that the replacement SPNDs 40 can be used to detect neutron flux values within the core 8 which are then employed to create the characterization 88, which is a characterization of neutron flux along the core 8. The geometry of the legacy SPNDs 48, specifically the legacy locations 64, is then employed in order to determine the representative flux values 94 which are then subject to the depletion algorithm 98 and other necessary formatting for input to the legacy software 99.

FIG. 3 depicts in a flowchart certain aspects of an improved method in accordance with the disclosed and claimed concept. Processing can begin, as at 205, where the plurality of replacement SPNDs 40 are subjected to a neutron flux within the core 8 of the nuclear reactor 6 in order to responsively receive from the replacement SPNDs 40 a set of output signals. While not expressly depicted in FIG. 3, it is noted that the method can actually begin with removal and replacement of the legacy SPNDs 48 with the replacement SPNDs 40. Processing then continues, as at 210, where the set of signals from the replacement SPNDs 40 are employed in order to generate a set of measured flux values 92 at a plurality of corresponding replacement locations 84 along the core 8. As mentioned, this includes the subtracting certain of the current signals from other current signals in order to generate net current signals, and can additionally include normalization of such net values and conversion of measured net current values into neutron flux values based upon the average neutron sensitivity of the replacement SPNDs 40.

Processing then continues, as at 215, wherein the set of measured flux values and the corresponding replacement locations 84 are subjected to a fitting tool 86 in order to generate the characterization 88 of the neutron flux as a function of location along the core 8. While in the depicted exemplary embodiment the fitting tool 86 is depicted as being executed on the processor 20, it is understood that the fitting tool 86 can be executed on any type of processor, whether or not that processor is a part of the system 4. This is because the polynomial, once created, likely can be reused during continued operation of the system 4 without a need to regularly recreate it.

Processing then continues, as at 220, where the characterization 88 is employed in conjunction with the legacy locations 64 in order to generate a set of representative flux values that are representative of the neutron flux that the legacy SPNDs 48 would have experienced at the legacy locations 64. Such further processing can additionally include subjecting the representative flux values to the depletion algorithm 98 and can additionally include other formatting that is necessary to enable input of the values into the legacy software 99.

Processing then continues, as at 225, wherein a number of signals that are based at least in part upon the set of representative flux values 94 are input to the processor apparatus 16 for execution by the legacy software 99.

It thus can be seen that the improved method and system 4 enable the legacy software 99 to continue operation after replacement of the legacy SPNDs 48 with the replacement SPNDs by inputting to the legacy software 99 signals that are derived from the replacement SPNDs 40. Other benefits will be apparent.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of enabling a plurality of replacement Self-Powered Neutron Detectors (SPNDs) to be used in place of a plurality of legacy SPNDs that previously were situated at, and have been removed from, a plurality of corresponding legacy locations along a core of a nuclear reactor and that previously provided to a processor apparatus a set of inputs that were representative of a neutron flux in the core as detected at the plurality of corresponding legacy locations, the method comprising:
   subjecting the plurality of replacement SPNDs to the neutron flux and, responsive thereto, receiving from the plurality of replacement SPNDs a set of signals, wherein at least one of the material, the neutron sensitivity, or the geometry of the replacement SPNDs is different than the legacy SPNDs;
   employing the set of signals to generate a plurality of measured flux values at a plurality of corresponding replacement locations along the core;
   subjecting the plurality of measured flux values to a fitting tool to generate a characterization of the neutron flux as a function of location along the core;
   employing the characterization and the plurality of corresponding legacy locations to generate a set of representative flux values that are representative of the neutron flux that the plurality of legacy SPNDs would have experienced at the plurality of corresponding legacy locations; and
   inputting to the processor apparatus as the set of inputs a number of signals that are based at least in part upon the set of representative flux values.

2. The method of claim 1, further comprising subjecting the set of representative flux values to a depletion algorithm to generate a set of depleted representative flux values that are representative of what the plurality of legacy SPNDs in an at least partially depleted state would have output in response to the neutron flux at the plurality of corresponding legacy locations, the number of signals being based at least in part upon the set of depleted representative flux values.

3. The method of claim 1 wherein at least one replacement SPND of the plurality of replacement SPNDs is of a length greater than that of another replacement SPND of the plurality of replacement SPNDs, a portion of the one replacement SPND protruding beyond the another replacement SPND, the at least one replacement SPND outputting a signal of the set of signals, the another replacement SPND outputting another signal of the set of signals, and further comprising:
   subtracting one of the signal and the another signal from the other of the signal and the another signal to generate a signal differential; and
   employing the signal differential in the generating of a measured flux value of the plurality of measured flux values whose corresponding replacement location of the plurality of corresponding replacement locations is along the portion of the one replacement SPND.

4. The method of claim 3 wherein a particular replacement SPND of the plurality of replacement SPNDs is of a length less than that of every other replacement SPND of the plurality of replacement SPNDs and outputs a particular signal of the set of signals, and further comprising employing the particular signal as a particular measured flux value of the plurality of measured flux values whose corresponding replacement location of the plurality of corresponding replacement locations is along the particular replacement SPND.

5. The method of claim 3, further comprising employing a center point along the portion of the one replacement SPND as the corresponding replacement location that is along the portion of the one replacement SPND.

6. The method of claim 1 wherein the subjecting of the plurality of measured flux values to a fitting tool comprises subjecting to the fitting tool the plurality of measured flux values along with a pair of null values that are representative of zero or near zero neutron flux at the margins of the core.

7. The method of claim 1, further comprising employing as the plurality of corresponding legacy locations a center point on each legacy SPND of the plurality of legacy SPNDs.

8. The method of claim 1, further comprising removing from the core the plurality of legacy SPNDs and installing into the core the plurality of replacement SPNDs.

9. The method of claim 1, further comprising employing an average neutron sensitivity of the plurality of legacy SPNDs along with the characterization and the plurality of corresponding legacy locations in the generating of the set of representative flux values.

10. A system comprising:
   a nuclear reactor having a core;
   a processor apparatus;
   a plurality of replacement Self-Powered Neutron Detectors (SPNDs) positioned in the core in place of a plurality of legacy SPNDs that previously were situated at, and have been removed from, a plurality of corresponding legacy locations along the core and that previously provided to the processor apparatus a set of inputs that were representative of a neutron flux in the core as detected at the plurality of corresponding legacy locations, wherein at least one of the material, the neutron sensitivity, or the geometry of the replacement SPNDs is different than the legacy SPNDs;
   the processor apparatus comprising a set of instructions which, when executed on the processor apparatus, cause the processor apparatus to perform operations comprising:
   receiving from the plurality of replacement SPNDs a set of signals responsive to the plurality of replacement SPNDs being subject to the neutron flux;
   employing the set of signals to generate a plurality of measured flux values at a plurality of corresponding replacement locations along the core;
   subjecting the plurality of measured flux values to a fitting tool to generate a characterization of the neutron flux as a function of location along the core;
   employing the characterization and the plurality of corresponding legacy locations to generate a set of representative flux values that are representative of the neutron flux that the plurality of legacy SPNDs would have experienced at the plurality of corresponding legacy locations; and employing as the set of inputs a number of signals that are based at least in part upon the set of representative flux values.

11. The system of claim 10 wherein the operations further comprise subjecting the set of representative flux values to a depletion algorithm to generate a set of depleted representative flux values that are representative of what the plurality of legacy SPNDs in an at least partially depleted state would have output in response to the neutron flux at the plurality of corresponding legacy locations, the number of signals being based at least in part upon the set of depleted representative flux values.

12. The system of claim 10 wherein at least one replacement SPND of the plurality of replacement SPNDs is of a length greater than that of another replacement SPND of the plurality of replacement SPNDs, a portion of the one replacement SPND protruding beyond the another replacement SPND, the at least one replacement SPND outputting a signal of the set of signals, the another replacement SPND outputting another signal of the set of signals, and wherein the operations further comprise:

subtracting one of the signal and the another signal from the other of the signal and the another signal to generate a signal differential; and employing the signal differential in the generating of a measured flux value of the plurality of measured flux values whose corresponding replacement location of the plurality of corresponding replacement locations is along the portion of the one replacement SPND.

13. The system of claim 12 wherein a particular replacement SPND of the plurality of replacement SPNDs is of a length less than that of every other replacement SPND of the plurality of replacement SPNDs and outputs a particular signal of the set of signals, and wherein the operations further comprise employing the particular signal as a particular measured flux value of the plurality of measured flux values whose corresponding replacement location of the plurality of corresponding replacement locations is along the particular replacement SPND.

14. The system of claim 12 wherein the operations further comprise employing a center point along the portion of the one replacement SPND as the corresponding replacement location that is along the portion of the one replacement SPND.

15. The system of claim 10 wherein the subjecting of the plurality of measured flux values to a fitting tool comprises subjecting to the fitting tool the plurality of measured flux values along with a pair of null values that are representative of zero or near zero neutron flux at the margins of the core.

16. The system of claim 10 wherein the operations further comprise employing as the plurality of corresponding legacy locations a center point on each legacy SPND of the plurality of legacy SPNDs.

17. The system of claim 10 wherein the operations further comprise employing an average neutron sensitivity of the plurality of legacy SPNDs along with the characterization and the plurality of corresponding legacy locations in the generating of the set of representative flux values.

* * * * *